(12) United States Patent
Pereira et al.

(10) Patent No.: US 11,433,336 B2
(45) Date of Patent: Sep. 6, 2022

(54) DRIVE PINION OF AN AIR-OIL SEPARATOR OF A TURBOMACHINE ACCESSORY GEARBOX

(71) Applicant: SAFRAN AIRCRAFT ENGINES, Paris (FR)

(72) Inventors: Alexis Pereira, Moissy-Cramayel (FR); Thierry Kohn, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 270 days.

(21) Appl. No.: 16/834,932

(22) Filed: Mar. 30, 2020

(65) Prior Publication Data
US 2020/0316506 A1 Oct. 8, 2020

(30) Foreign Application Priority Data

Apr. 4, 2019 (FR) ...................................... 1903620

(51) Int. Cl.
*B01D 45/00* (2006.01)
*B01D 45/14* (2006.01)
(Continued)

(52) U.S. Cl.
CPC ............. *B01D 45/14* (2013.01); *B01D 45/12* (2013.01); *F02C 7/32* (2013.01);
(Continued)

(58) Field of Classification Search
CPC .. B01D 45/14; B01D 45/12; B01D 2257/702; B01D 2259/4575; F02C 7/32; F02C 7/36;
(Continued)

(56) References Cited

U.S. PATENT DOCUMENTS 3,378,104 A * 4/1968 Venable .............. F16H 57/0458
184/6.12
3,789,684 A * 2/1974 Freier, Jr. ............ F16H 57/0412
474/33
(Continued)

FOREIGN PATENT DOCUMENTS

FR 3007463 A1 12/2014
WO WO 2018/172645 A1 9/2018

OTHER PUBLICATIONS

Search Report from French Intellectual Property Office on corresponding FR application (FR1903620) dated Dec. 17, 2019.

*Primary Examiner* — Dung H Bui
(74) *Attorney, Agent, or Firm* — Klein, O'Neill & Singh, LLP (57) ABSTRACT

A drive pinion of an air/oil separator of an accessory gearbox of a turbomachine, the air/oil separator being configured to be supplied at the input by an air flow to de-oil and to supply at the output, on the one hand, a de-oiled air flow and, on the other hand, an oil flow by centrifugation, the pinion being configured to drive the separator rotationally along an axis of rotation, the pinion being mounted facing a passage opening of the separator, the pinion comprising at least one guiding opening traversing the web plate defining at least one guiding surface inclined with respect to the axis of rotation in such a way as to guide along the axis an air flow to de-oil into the separator or a de-oiled air flow out of the separator via the guiding opening of the pinion.

20 Claims, 5 Drawing Sheets

(51) Int. Cl.
  *F02C 7/32* (2006.01)
  *B01D 45/12* (2006.01)
  *F02C 7/36* (2006.01)
  *F16H 55/17* (2006.01)
  *F01D 25/18* (2006.01)

(52) U.S. Cl.
  CPC .............. *B01D 2257/702* (2013.01); *B01D 2259/4575* (2013.01); *F01D 25/18* (2013.01); *F02C 7/36* (2013.01); *F05D 2260/4031* (2013.01); *F16H 55/17* (2013.01); *Y10T 428/211* (2015.01); *Y10T 428/218* (2015.01)

(58) Field of Classification Search
  CPC ....... F05D 2260/4031; F05D 2250/411; F05D 2260/609; F16H 55/17; F01D 25/18; Y10T 428/211; Y10T 428/218
  See application file for complete search history.

(56) References Cited

U.S. PATENT DOCUMENTS

| | | | | |
|---|---|---|---|---|
| 4,022,074 A * | 5/1977 | Mabuchi | ................. | F04D 25/02 74/421 A |
| 4,049,401 A * | 9/1977 | Smith | .................. | F04C 29/026 55/525 |
| 4,836,046 A * | 6/1989 | Chappel | .................. | B62M 9/08 474/57 |
| 4,982,705 A * | 1/1991 | Hudson | .................... | F01P 5/06 123/41.7 |
| 5,232,422 A * | 8/1993 | Bishop, Jr. | ......... | A63B 22/0007 482/64 |
| 5,257,562 A * | 11/1993 | Nagano | .................... | B62M 3/08 74/594.2 |
| 5,716,423 A * | 2/1998 | Krul | ....................... | B01D 45/14 55/487 |
| 5,890,398 A * | 4/1999 | Matsuno | ................. | F16H 45/02 403/337 |
| 5,980,412 A * | 11/1999 | Smith | ................... | F16H 35/008 74/64 |
| 6,033,450 A * | 3/2000 | Krul | ....................... | B01D 45/14 55/438 |
| 6,813,971 B2 * | 11/2004 | Hagiwara | ............... | F16H 55/17 74/DIG. 10 |
| 2010/0224020 A1 * | 9/2010 | Haussecker | ............. | F16H 55/17 74/425 |
| 2011/0085890 A1 * | 4/2011 | Brink | .................... | F01D 15/12 74/606 R |
| 2013/0205945 A1 * | 8/2013 | Hosaka | .................... | B62M 6/50 74/594.2 |
| 2015/0007531 A1 | 1/2015 | Beier et al. | | |
| 2015/0176447 A1 * | 6/2015 | Beier | ..................... | F01M 13/04 415/110 |
| 2015/0354667 A1 * | 12/2015 | Tesar | ..................... | H02K 7/116 475/180 |
| 2016/0062299 A1 * | 3/2016 | Hirose | ............... | G03G 15/1615 399/167 |
| 2019/0011014 A1 * | 1/2019 | Zouani | .................. | F16F 15/262 |
| 2020/0217410 A1 * | 7/2020 | Yamaguchi | ............. | F16H 55/17 |
| 2021/0131322 A1 * | 5/2021 | Nifenecker | ............ | B01D 45/14 |
| 2021/0131548 A1 * | 5/2021 | Leque | ..................... | F16H 55/14 |
| 2021/0231204 A1 * | 7/2021 | Morio | ..................... | F16H 55/14 |
| 2021/0231206 A1 * | 7/2021 | Morio | ..................... | F16H 55/14 |

\* cited by examiner

DRIVE PINION OF AN AIR-OIL SEPARATOR OF A TURBOMACHINE ACCESSORY GEARBOX

TECHNICAL FIELD

The present invention relates to the field of turbomachines and, more particularly, an accessory gearbox for turbomachine.

Conventionally, a turbomachine for the propulsion of an aircraft comprises an accessory gearbox, designated AGB. Such a gearbox comprises a plurality of toothed wheels, designated pinions, which are rotationally driven by the turbomachine in order to supply accessories, such as electrical generators, pumps, an air/oil separator, etc.

Figure 1:
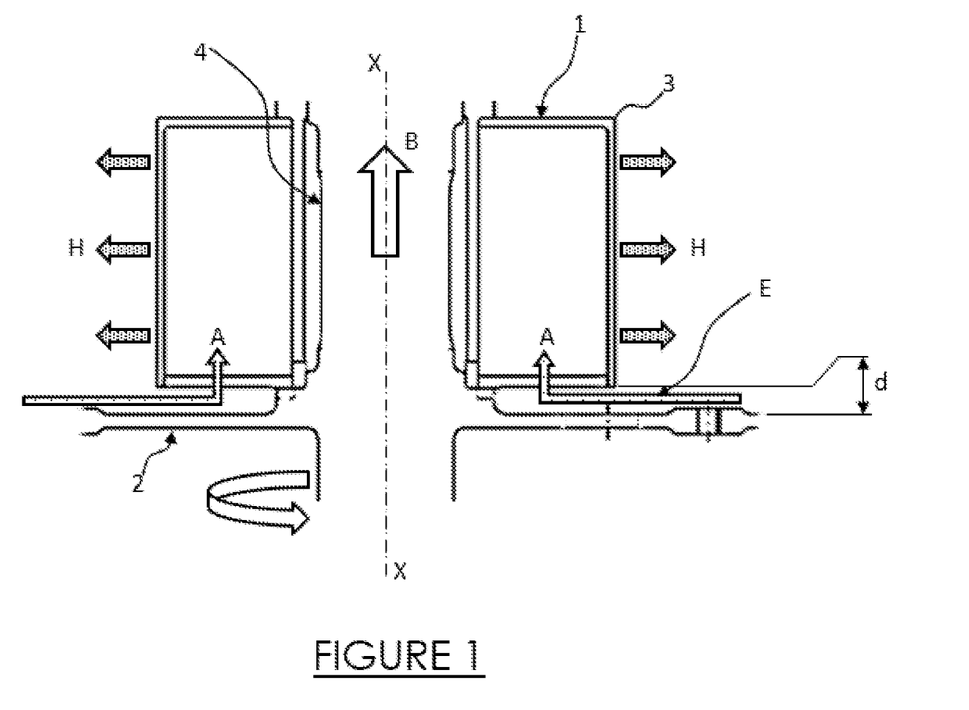
FIG. 1 is a schematic view in section of an accessory gearbox according to the prior art (described previously)

With reference to FIG. 1, an air/oil separator 1 is represented configured to receive at the input an air flow to de-oil A and to supply at the output, on the one hand, an oil flow H and, on the other hand, a de-oiled air flow B. In practice, the separator 1 is driven rotationally by a pinion 2 of the accessory gearbox so as to enable separation by centrifugation.

In a known manner, the separator 1 comprises a cylindrical body 3 mounted on a hollow shaft 4 extending along an axis X and which is integral with the pinion 2. The cylindrical body 3 comprises an input E of the air flow to de-oil A which is formed between the cylindrical body 3 and the pinion 2. Also, in operation, the air flow to de-oil A penetrates radially with respect to the axis X then parallel to the axis X in the cylindrical body 3 where it is separated into two distinct streams B, H, as illustrated in FIG. 1. The de-oiled air flow B is discharged from the separator 1 via the hollow shaft 4 which forms a discharge conduit.

Such a solution has drawbacks. Indeed, new accessories being added to the accessory gearbox, the space available inside said gearbox is reduced. In particular, the axial distance d between the oil separator 1 and the pinion 2 is reduced to increase compactness. The passage section of the input E is then smaller and smaller, which limits the circulation of the air flow to de-oil A in the separator 1. The efficiency of the separator 1 is then reduced, which represents a major drawback.

There thus exists a need for a turbomachine having a compact accessory gearbox to receive a large number of accessories while enabling an optimal supply of the separator 1 with air flow to de-oil A.

In an incident manner, a pinion, integral with a central tube, which comprises radial arms delimiting between them passage openings for an air flow which are straight, that is to say, aligned with the axis of rotation X, is known from the patent application FR3007463A1. Such passage openings enable a weight gain.

SUMMARY

A drive pinion of an air/oil separator of an accessory gearbox of a turbomachine, the air/oil separator being configured to be supplied at the input by an air flow to de-oil and to supply at the output, on the one hand, a de-oiled air flow and, on the other hand, an oil flow by centrifugation, the pinion being configured to drive the separator rotationally along an axis of rotation, the pinion being suited to being mounted facing a passage opening of the separator configured to enable the passage of an air flow to de-oil or a de-oiled air flow, the pinion comprising a central axis extending along an axis of rotation X, a toothed peripheral part and a web plate extending between the central axis and the peripheral part.

The invention is remarkable in that the pinion comprises at least one guiding opening traversing the web plate, said at least one guiding opening defining at least one guiding surface inclined with respect to the axis of rotation X in such a way as to guide, parallel to the axis, an air flow to de-oil into the separator or a de-oiled air flow out of the separator via the guiding opening of the pinion.

Thanks to the pinion according to the invention, the air/oil separator enables the input of an air flow to de-oil or the output of a de-oiled air flow through the pinion, which increases the passage section compared to the prior art. Thus, the distance between the pinion and the separator may be small in order to increase compactness without disrupting the input or the output of air of the separator. Moreover, the inclined guiding surface allows the guiding opening to fulfil a function of straightening vane. The guiding surface makes it possible to accelerate the circulation of an air flow entering or exiting the separator by producing a suction effect. The flow rate is advantageously increased, which enables an optimal operation of the separator. Advantageously, the pinion 20 thus fulfils a first function of driving the separator and a second function of injection/aspiration of an air flow into/out of the separator.

Unlike the patent application FR3007463A1 which teaches a pinion comprising radial arms delimiting between them passage openings for an air flow in order to enable a weight gain, the present invention proposes allowing an air flow to circulate but also to guide it. The circulation flow rate is increased, which is advantageous.

Preferably, the guiding surface is inclined with respect to the axis of rotation by an angle θ comprised between 5° and 75°, preferably, between 20° and 60°, further preferably, between 30° and 50°. Such an angle enables optimal straightening of the incoming or exiting air flow of the separator as well as an increase in the flow rate.

Preferably, the guiding surface extends radially to the axis of rotation X. Thus, the guiding surface makes it possible to straighten the air flow during the rotation of the pinion. It is understood that the guiding surface extends along its length in the radial direction.

According to a preferred aspect, the guiding opening defines at least two guiding surfaces opposite each other. Thus, the air is guided between the two guiding surfaces in order to limit disruptions. The air flow is straightened in a homogeneous manner.

Preferably, the two guiding surfaces are radial. The two guiding surfaces advantageously define a channel which is inclined with respect to the axis of rotation X in order to enable an acceleration by suction effect.

According to a preferred aspect, the two guiding surfaces have identical dimensions.

Preferably, the pinion comprises a plurality of openings each defining at least one guiding surface in order to guide and to accelerate an important amount of air into or out of the separator.

Preferably, the guiding openings are distributed radially around the axis of rotation X.

The invention also relates to an accessory gearbox for turbomachine, said gearbox comprising an air/oil separator, configured to be supplied at the input by an air flow to de-oil and to supply at the output, on the one hand, a de-oiled air flow and, on the other hand, an oil flow by centrifugation, and a pinion such as described previously configured to drive the separator rotationally along an axis of rotation, the pinion being mounted facing a passage opening of the separator configured to enable the passage of an air flow to de-oil or a de-oiled air flow.

The invention further relates to a turbomachine, notably for aircraft, comprising an accessory gearbox such as described previously.

BRIEF DESCRIPTION OF THE DRAWINGS

The invention will be better understood on reading the description that follows, given uniquely as an example, and by referring to the appended drawings in which.

It should be noted that the figures set out the invention in a detailed manner for implementing the invention, said figures obviously being able to better define the invention if need be.

DETAILED DESCRIPTION

Figure 2:
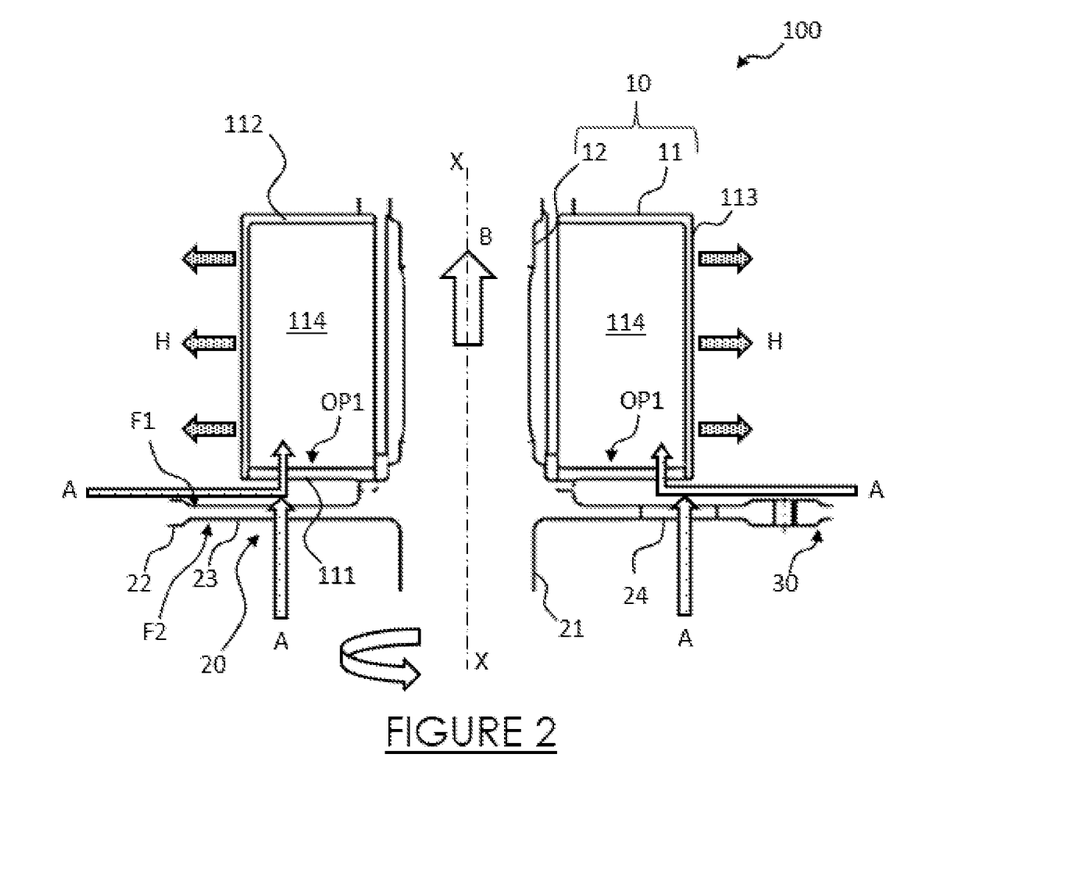
FIG. 2 is a schematic view in section of an embodiment of an accessory gearbox according to the invention.

With reference to FIG. 2, an embodiment of an accessory gearbox according to the invention is represented. Such an accessory gearbox is mounted in a turbomachine, notably for an aircraft, and makes it possible to actuate accessories which participate in the operation of the turbomachine.

In this example, the accessory gearbox 100 comprises a casing (not represented), wherein is mounted an air/oil separator 10 and a plurality of pinions 20, 30.

The pinions 20, 30 mutually drive each other rotationally and are driven rotationally by the turbomachine in a known manner. Each pinion 20, 30 makes it possible to actuate an accessory by driving it rotationally. In the example illustrated in FIG. 2, the pinion 20 according to the invention is connected to the air/oil separator 10 in order to drive it rotationally.

The air/oil separator 10, also designated de-oiler, makes it possible to separate oil from air in order to discharge air from the accessory gearbox 100. The air/oil separator 10 is configured to be supplied at the input by an air flow to de-oil A and to supply at the output, on the one hand, a de-oiled air flow B and, on the other hand, an oil flow H by centrifugation. Still with reference to FIG. 2, the separator 10 comprises a cylindrical body 11 and a shaft 12. The pinion 20 is connected to the shaft 12 in order to drive it rotationally around the axis X.

The shaft 12 extends along an axis X and is mounted internally and coaxially to the cylindrical body 11 and makes it possible to drive it rotationally around the axis X. The cylindrical body 11 extends axially along the axis X between a first end 111, called proximal end, oriented towards the pinion 20, and a second end 112, called distal end. The cylindrical body 11 comprises a peripheral wall 113 extending between the first 111 and the second end 112. In this example, the peripheral wall 113 comprises means for guiding the oil H and an orifice for discharging the oil H out of the cylindrical body 11. The cylindrical body 11 further comprises a cavity 114, defined internally to the peripheral wall 113, into which enters the air to de-oil A. The air to de-oil A is in the form of air loaded with oil H, in other words in the form of an oil mist.

In the example illustrated in FIG. 2, the cylindrical body 11 comprises at the level of the first end 111 a passage opening OP1 in order to allow the air to de-oil A to enter into the cavity 114. As described previously, an air flow to de-oil A may circulate radially between the pinion 20 and the air/oil separator 10 to penetrate into the passage opening OP1 situated facing the pinion 20. During the rotation of the separator 10, the oil H of the cavity 114 is projected radially outwards against the peripheral wall 113 where it is guided by guiding means to the discharge orifice.

The shaft 12 is hollow in order to form a conduit making it possible to guide the de-oiled air flow B out of the separator 10. The shaft 12 comprises one or more openings making it possible to place in communication the inner cavity of the shaft 12 with the volume of the cylindrical body 11 wherein circulates the air to de-oil A. Thus, the de-oiled air flow B can circulate from the cylindrical body 11 to the inner cavity of the shaft 12 via the openings. The de-oiled air flow B, separated from the oil flow H, is thus discharged out of the cavity 114 of the cylindrical body 11 via the shaft 12. In particular, the de-oiled air flow B is discharged towards the second end 112 of the cylindrical body 11, as illustrated in FIG. 2. Thus, the air flow to de-oil A enters into the cylindrical body 11 at the level of its first end 111 and the de-oiled air flow B is discharged out of the cylindrical body 11 at the level of its second end 112, the oil flow H being discharged radially.

As illustrated in FIGS. 2 to 5, the pinion 20 according to the invention is mounted on the air/oil separator 10 in order to drive it rotationally.

Figure 3:
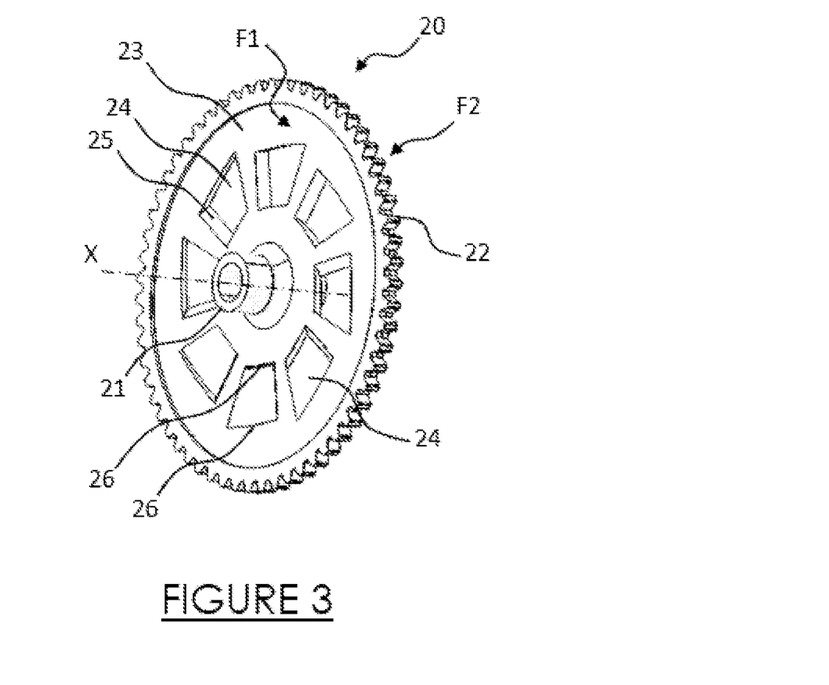
FIG. 3 is a schematic view of a pinion of the gearbox of FIG. 2.
Figure 4:
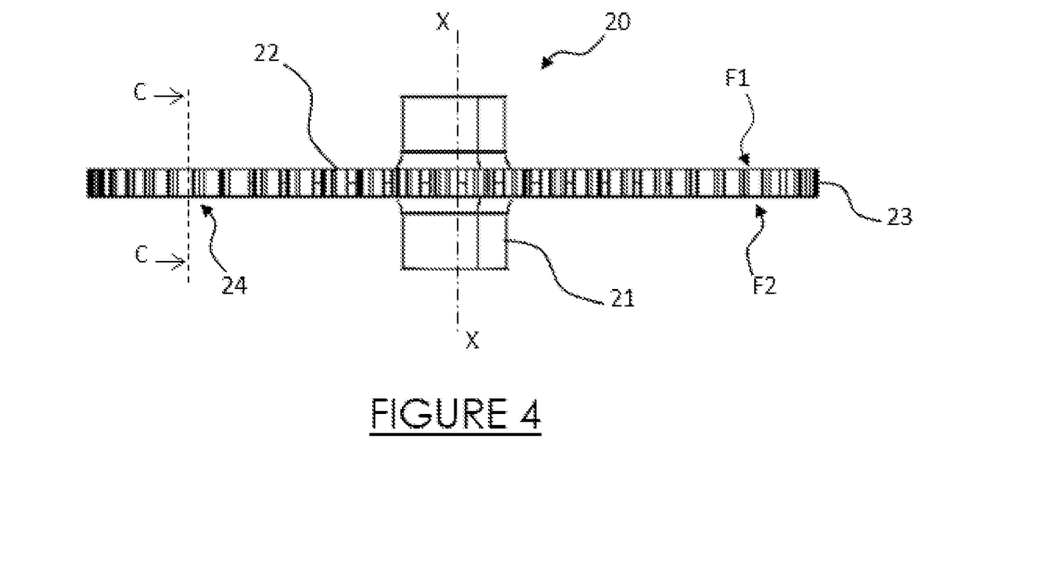
FIG. 4 is a schematic side view of the pinion of FIG. 3.

In a known manner, the pinion 20 comprises a central axis 21, a toothed peripheral part 22 and a web plate 23 extending between the central axis 21 and the peripheral part 22. Such a pinion 20 thus has a toothed wheel shape in order to be driven rotationally by an adjacent pinion 30. The peripheral part 22 comprises a plurality of teeth which are configured to engage with the teeth of the adjacent pinion 30 in order that the pinions 20, 30 mutually drive each other rotationally in a conventional manner.

The central axis 21 extends along the axis of rotation X and is configured to be mounted on the air/oil separator 10, notably, in the extension of the shaft 12 of the air/oil separator 10. The web plate 23 is in the form of a wall defining a first face F1 and a second face F2 opposite to the first face F1. When the pinion 20 is mounted on the separator 10, the first face F1 is oriented towards the cylindrical body 11.

According to the invention, with reference to FIG. 3, the pinion 20 comprises guiding openings 24 traversing the web plate 23 in order to enable the passage of the air flow to de-oil A through the pinion 20. In other words, the guiding openings 24 enable a fluidic communication between the first face F1 and the second face F2 in order to supply the separator 10 along a direction substantially parallel to the axis X. Thus, the air flow to de-oil A may supply the separator 10 while passing through the guiding openings 24 of the pinion 20. The air flow to de-oil A thus is not disrupted by the pinion 20 and its proximity with the separator 10. The pinion 20 comprises a plurality of guiding openings 24 distributed radially around the axis X of the pinion 20. This enables the passage of an important amount of air to de-oil A through the pinion 20.

In this example, with reference to FIG. 3, each guiding opening 24 has a polygonal shape defining four surfaces opposite two by two, two radial surfaces and two tangential surfaces 26. The two radial surfaces are designated "guiding surface 25" and make it possible to guide the air traversing the guiding opening 24 during the rotation of the pinion 20 in the manner of a straightening vane. It goes without saying that the polygonal shape of the guiding opening 24 could comprise a different number of surfaces.

Figure 5:
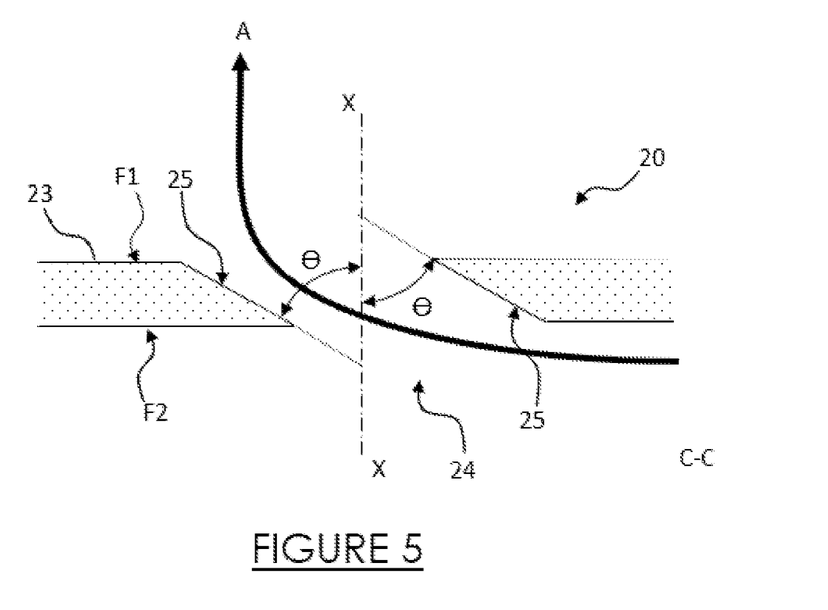
FIG. 5 is a schematic view in section of a guiding opening of the pinion of FIG. 4.

As illustrated in FIG. 5, which represents a partial view of a guiding opening 24 of a pinion 20 along the section C-C, the guiding surfaces 25 are inclined with respect to the axis X of the pinion 20. In other words, each guiding surface 25 defines an angle θ with the axis X. Such inclined guiding surfaces 25 thus make it possible to straighten an air flow at the input to supply an air flow at the output having an axial incidence in the passage opening OP1. Preferably, the angle θ is comprised between 5° and 75°, preferably, between 20° and 60°, further preferably, between 30° and 50° in order to guide the air in an optimal manner. Further preferably, the guiding surfaces 25 are flat so as to enable a straightening and an acceleration. Further preferably, the guiding surfaces 25 have identical dimensions.

Thus, thanks to the invention, the air/oil separator 10 may be supplied in an optimal manner by an air flow to de-oil A and this is so even if the compactness is important in the accessory gearbox 100 and that the distance between the air/oil separator 10 and the pinion 20 is reduced. In addition, the use of guiding surfaces 25 enables an optimal circulation in the air/oil separator 10 and an important flow rate. In the manner of a fan, the pinion 20 makes it possible to suck up and to accelerate an air flow during its rotation. Advantageously, the pinion 20 thus fulfils a first function of driving the separator 10 and a second function of injecting an air flow into the separator 10.

A pinion 20 situated in the vicinity of the input of the air flow to de-oil A of the air/oil separator 10 has been described but it goes without saying that the invention also applies to a pinion 20 situated in the vicinity of the output of de-oiled air B of the air/oil separator 10

Figure 6:
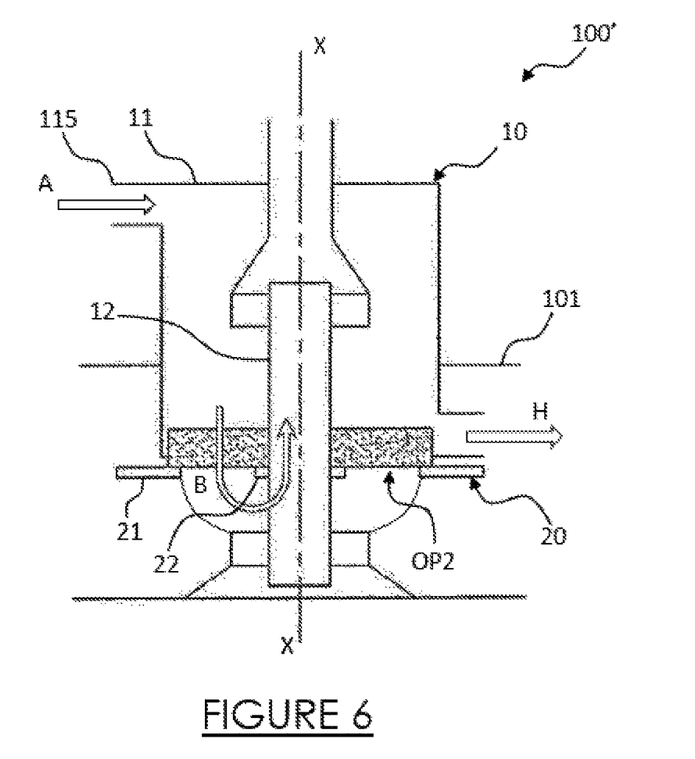
FIG. 6 is a schematic view in section of an alternative embodiment of an accessory gearbox according to the invention.

With reference to FIG. 6, a gearbox 100' is represented wherein the air/oil separator 10 comprises a part mounted on the outside of the casing 101 of the gearbox 100' and of which the output of the de-oiled air flow B is situated in the vicinity of the drive pinion 20.

In this example, the pinion 20 is mounted on the air/oil separator 10 at the level of its proximal end. The separator 10 is supplied by an air flow to de-oil A via a conduit 115 placed at its distal end, in other words on the outside of the casing 101 of the gearbox 100'. When the separator 10 is driven rotationally, the air flow to de-oil A enters into the separator 10 via this conduit 115, the oil flow H and the de-oiled air flow B are separated by centrifugal effect and the de-oiled air flow B comes out of the cavity via a passage opening OP2 at the level of the proximal end, that is to say, facing the pinion 20.

The de-oiled air flow B is guided out of the cavity by the guiding surfaces 25 of the pinion 20. In other words, in this embodiment, the guiding surface 25 of the pinion 20 makes it possible, on the one hand, to guide the de-oiled air flow B and, on the other hand, to expel this de-oiled air B out of the cavity of the separator 10 by suction effect.

The shaft 12 comprises one or more openings (not represented) making it possible to place in communication the inner cavity of the shaft 12 with the volume wherein circulates the air to de-oil A. Thus, the de-oiled air flow B can circulate in the inner cavity of the shaft 12 via the openings.

The de-oiled air flow B is next discharged from the separator 10 via the hollow shaft 12 at the level of the distal end of the separator 10. In other words, the de-oiled air flow B is discharged at the level of the same end of the separator 10 from which it is supplied by an air flow to de-oil A.

The invention claimed is:

1. An apparatus comprising a drive pinion and an air/oil separator of an accessory gearbox of a turbomachine, the air/oil separator being configured to be supplied at an input by an air flow to de-oil and to supply at an output a de-oiled air flow and an oil flow by centrifugation, the drive pinion being configured to drive the air/oil separator rotationally along an axis of rotation, the drive pinion being mounted facing a passage opening of the air/oil separator and configured to enable passage of the air flow to de-oil or the de-oiled air flow, the drive pinion comprising a central axis extending along the axis of rotation, a toothed peripheral part, and a web plate extending between the central axis and the toothed peripheral part, wherein at least one guiding opening traversing the web plate, said at least one guiding opening having at least two guiding surfaces that are inclined with respect to the axis of rotation in such a way as to guide, parallel to the axis of rotation, the air flow to de-oil into the air/oil separator or the de-oiled air flow out of the air/oil separator via the first guiding opening of the pinion.

2. The apparatus according to claim 1, wherein each of the two the guiding surfaces is inclined with respect to the axis of rotation by an angle comprised between 5° and 75°.

3. The apparatus according to claim 1, wherein the at least two guiding surfaces extend radially to the axis of rotation.

4. The apparatus according to claim 1, wherein the at least two guiding surfaces form two of four sides of the at least one guiding opening.

5. The apparatus according to claim 1, wherein the at least two guiding surfaces have identical dimensions.

6. The apparatus according to claim 1, wherein the at least one guiding opening is a first guiding opening and further comprising a plurality of guiding openings, each of the plurality of guiding openings comprising a plurality of sides and wherein at least one of the sides is inclined with respect to the axis of rotation.

7. The apparatus according to claim 6, wherein the plurality of guiding openings are distributed radially around the axis of rotation.

8. An accessory gearbox comprising an air/oil separator for a turbomachine, the accessory gearbox further comprising:
a pinion configured to rotationally drive the air/oil separator about an axis of rotation, said pinion comprising a circular body, said circular body comprising:
a first hollow shaft at a center of the pinion and rotatable around the axis of rotation;
a plurality of gear teeth located along a periphery of the circular body;
a web plate formed between the first hollow shaft and the plurality of gear teeth, said web plate having a plurality of guiding openings that are arranged in spaced apart relations with each of the plurality of guiding openings having a plurality of interconnected sides including a first side having a first guiding surface and a second side having a second guiding surface, the first and second guiding surfaces are inclined with respect to the axis of rotation and opposed one another to guide an airflow parallel to the axis of rotation;

the air/oil separator comprising:

a cylindrical body having a proximal end with a flow input, a distal end, and a cavity between the proximal end and the distal end; and a second hollow shaft located internally and arranged coaxially with an axis of the cylindrical body, the second hollow shaft adjoins and aligns with the first hollow shaft about the axis of rotation; and wherein the proximal end of the air/oil separator adjoins the pinion.

9. The accessory gearbox of claim 8, wherein the air/oil separator further comprises a peripheral wall extending between the proximal and distal end, and the oil from the oiled airflow is configured to transfer radially outwards towards the peripheral wall.

10. The accessory gearbox of claim 9, wherein the second hollow shaft comprises one or more openings fluidly connecting the cavity of the cylindrical body to an inner cavity of the second hollow shaft to create a flow output for a de-oiled air.

11. The accessory gearbox of claim 8, wherein the pinion is a first pinion configured to be rotationally driven by a second pinion.

12. The accessory gearbox of claim 11, wherein the second pinion is configured to be rotationally driven by the turbomachine.

13. The accessory gearbox of claim 8, wherein the pinion is driven by the turbomachine.

14. The accessory gearbox of claim 8, wherein the plurality of guiding openings is polygonal shaped and symmetrically spaced apart from each other.

15. The accessory gearbox of claim 14, wherein the first and second guiding surfaces of each of the plurality of guiding openings have identical dimensions.

16. An accessory gearbox comprising an air/oil separator for a turbomachine, the accessory gearbox further comprising:

a pinion configured to rotationally drive the air/oil separator about an axis of rotation, the pinion comprising a circular body, said circular body comprising:

a first hollow shaft at a center of the pinion and rotatable about the axis of rotation;

a plurality of gear teeth located along a periphery of the circular body;

a web plate formed between the first hollow shaft and the plurality of gear teeth, said web plate having a plurality of guiding openings, wherein each of the plurality of guiding openings having at least two guiding surfaces that are inclined with respect to the axis of rotation to guide an airflow parallel to the axis of rotation;

the air/oil separator comprising:

a cylindrical body having a proximal end with a flow input, a distal end, and a cavity between the proximal end and the distal end; and a second hollow shaft located internally and arranged coaxially with an axis of the cylindrical body, said second hollow shaft adjoins and aligns with the first hollow shaft about the axis of rotation, and the second hollow shaft having one or more openings fluidly connecting the cavity of the cylindrical body to an inner cavity of the second hollow shaft to create a flow output for a de-oiled air; and wherein the proximal end of the air/oil separator adjoins the first pinion so that airflow traverses through the flow input.

17. The accessory gearbox of claim 16, wherein the at least two guiding surfaces of each guiding opening opposed one another.

18. The accessory gearbox of claim 16, wherein the air/oil separator further comprises a peripheral wall for the oil from the oiled airflow to exit the air/oil separator through the peripheral wall.

19. The accessory gearbox of claim 16, wherein the pinion is a first pinion and a second pinion contacting the first pinion on the plurality of gear teeth is configured to rotationally drive the first pinion.

20. The accessory gearbox of claim 19, wherein the second pinion is driven by the turbomachine.

* * * * *